March 12, 1963    A. H. WEDDENDORF, JR    3,080,570
SINGLE LEVER FAUCET INCORPORATING TILTABLE VALVES
Filed April 28, 1958      3 Sheets-Sheet 1

INVENTOR.
ALBERT H. WEDDENDORF JR.
BY Schmieding and Fultz
ATTORNEYS

March 12, 1963 A. H. WEDDENDORF, JR 3,080,570
SINGLE LEVER FAUCET INCORPORATING TILTABLE VALVES
Filed April 28, 1958 3 Sheets-Sheet 2
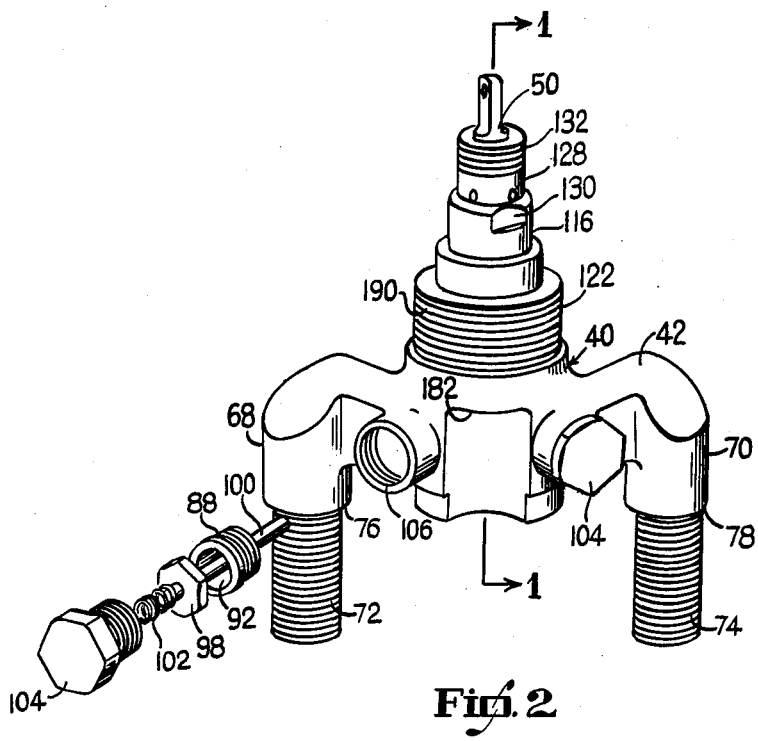
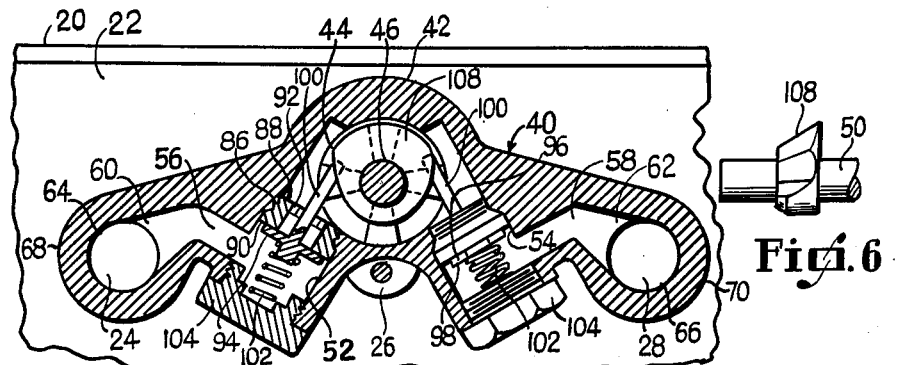
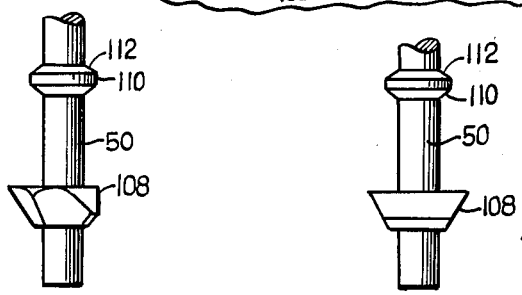
INVENTOR.
ALBERT H. WEDDENDORF JR.
BY Schmieding and Fultz
ATTORNEYS March 12, 1963    A. H. WEDDENDORF, JR    3,080,570
SINGLE LEVER FAUCET INCORPORATING TILTABLE VALVES
Filed April 28, 1958    3 Sheets-Sheet 3

INVENTOR.
ALBERT H. WEDDENDORF JR.
BY Schmieding and Fultz
ATTORNEYS 3,080,570
Patented Mar. 12, 1963

3,080,570
SINGLE LEVER FAUCET INCORPORATING TILTABLE VALVES
Albert H. Weddendorf, Jr., 5930 Farlook Drive, Cincinnati, Ohio
Filed Apr. 28, 1958, Ser. No. 731,408
2 Claims. (Cl. 4—192)

The present invention relates to mixing valves of the type wherein a single handle is used for controlling and regulating the quantity of fluid being ejected from one or two sources and/or the percentage flowing from either source.

The ledge, usually the rear, of standard wash basins and sinks are provided with aligned holes, one for hot water faucet, one for cold water faucet, and an intermediate for a drain plug actuating rod, or one for a hot water valve, one for a cold water valve, and an intermediate for either a faucet or a drain plug actuating rod.

One aspect of the present invention deals with providing a unitary valve which provides a mixing chamber connected with the hot and cold water pipes through the outer two of the three aligned holes on the aforementioned ledge, the unitary valve being so constructed and arranged as to be manipulatable through a single handle for not only controlling pressure and quantity of flow but also controlling hot and cold water and the combination of both, and so constructed and arranged so that a drain plug actuating rod can extend through the central of the three holes and extend above the unitary valve whereby it is readily accessible.

In carrying out this aspect of the invention, the valve body, the valves per se and the actuating mechanism between the handle and the valve are so arranged that the mixing chamber lies forwardly of the central hole in the aforementioned ledge.

Obviously two inlet valves are necessary in a mixing valve of this type, one for controlling and regulating the flow of cold water to the mixing chamber and one for controlling and regulating the flow of hot water to the mixing chamber.

Further with respect to the last mentioned aspect of the invention, in which the mixing chamber lies forwardly of the central opening in the sink or wash bowl ledge, the passages of the valve body leading from the hot and cold water pipes to the mixing chamber, include passage sections extending forwardly toward the mixing chamber, said sections being disposed at an angle to one another of less than 180 degrees; these sections each provide a valve seat; valves are disposed within the sections and co-operate with the seats for, respectively, controlling the flow of fluid through the passage sections; these valves are actuated by valve actuating mechanism disposed in the mixing chamber; the ends of the passage sections, opposite the ends connected with the mixing chamber, are closed by a removable plug which, when removed, provides access to the valves whereby they may be removed; also these passage sections are connected with laterally extending sections which in turn are connected, respectively, with the hot and cold water pipes.

I also provide an outlet valve between the mixing chamber and the outlet spout or faucet. I provide a shaft which carries the latter mentioned valve and which actuates and preferably directly carries camming means for actuating the hot and cold inlet valves. This shaft is actuated by a single handle which can be turned to a position so that when it is moved to open the outlet valve, cold water valve only is opened, or to a position so that when it is moved to open the outlet valve, hot water valve only is opened, or to any intermediate position so that when it is moved to open the outlet valve, any desired mixture of cold and hot water is made possible.

In carrying out the foregoing aspect of the invention, I arrange the outlet valve so that closing pressure is imparted thereto whereby when the manipulatable handle is released, the flow of water ceases.

A further aspect of the present invention lies in providing a valve in which an outlet spout or faucet therefor can be rotated fully 360 degrees. In this the outlet chamber leading to the spout is formed of two interconnected fittings and a collar or head, forming a part of the spout, bridging the fittings, the fittings being provided with concentric bearing surfaces about which the collar rotates.

The present invention also comprehends an improved diverter mechanism for diverting water from the faucet or nozzle to a movable spray nozzle, utilizing the valve body parts for providing the downward passage for the diverted water.

Further objects and advantages will be apparent from the following description, reference being had to the accompanying drawings wherein a preferred embodiment of the invention is illustrated.

In the drawings:

FIG. 2 is a perspective view from the rear of the valve and showing part of the mechanism in exploded position;

FIG. 3 is a sectional view taken along line 3—3 of FIG. 1 and shifted 90 degrees;

FIG. 4 is a rear view of the shutoff valve and the cam which is attached to the valve;

FIG. 5 is a view of the valve shown in FIG. 4 but turned approximately 120 degrees counterclockwise from that shown in FIG. 4;

FIG. 6 is a view of the valve showing FIG. 4 but turned approximately 90 degrees from that shown in FIG. 4.

Figure 1:
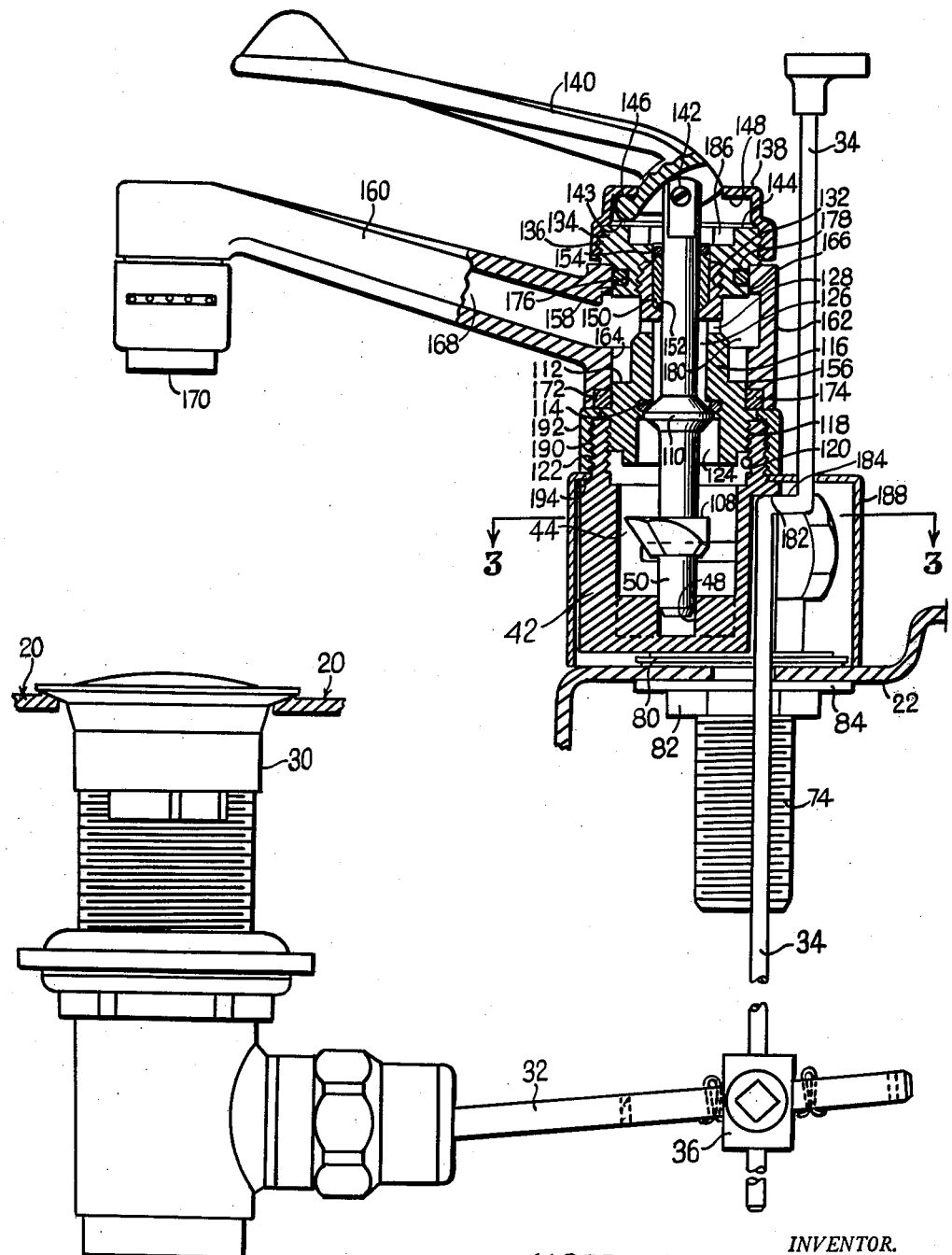
FIG. 1 is a side view of the improved mixing valve, the view being in longitudinal section and taken along the line 1—1 of FIG. 2, and also showing the horizontal ledge of a basin or sink, a drain valve or plug, and the actuating mechanism for opening and closing the drain valve.

Referring more in detail to the drawings, a sink or wash basin is shown at 20 having a rear and horizontally extending ledge 22. This ledge is provided with three aligned holes 24, 26 and 28, the intermediate hole being 26. These three aligned holes are standard in most wash basins and sinks, the two outer holes 24 and 28 being adapted to receive the pipes leading to either shutoff valves, or shutoff valves and faucets, and the center hole being adapted to receive a pipe for a faucet or a rod for actuating the drain valve. The conventional type of drain valve is shown at 30 in FIG. 1 which is normally closed by pulling upwardly on the lever 32, and opened by moving downwardly on the lever 32. Obviously the drain valve is in a lower position than that shown in FIG. 1, i.e., it is located at the bottom of the basin or sink. A vertically extending rod 34 is connected to the rod 32 by a universal coupling 36. This rod 34 is used for raising and lowering the rod 32.

The mixing valve is shown at 40. It includes a main body which may be in the form of a casting 42. The central, lower and forwardly extending portion of the body 42 is hollow as at 44 and is utilized as a mixing chamber for fluids, and such fluids will be referred to herein, for example, as hot and cold water. It will be observed that the mixing chamber 44 lies forwardly of the aligned holes, 24, 26 and 28 whereby part of the opening 26 is exposed so as to receive the rod 34. This mixing chamber 44 is generally circular in shape, the axis of which is at 46. The bottom of this mixing chamber is provided with four upwardly extending ledges which are centrally drilled as at 48 so as to provide a guide for a centrally disposed valve stem 50. Two passage sections 52 and 54 extend rearwardly from the mixing chamber 44 and are disposed at approximately 60 degrees from one another, that is 30 degrees on opposite sides of a vertical plane which intersects at right angles the axis of the three holes 24, 26 and 28. These passage sections 52 and 54 are connected with passage sections 56 and 58, which latter are disposed at right angles to passage sections 52 and 54 and extend forwardly. Passage sections 56 and 58 merge respectively with passage sections 60 and 62, which in turn merge with upwardly extending passages 64 and 66 in the opposite ends 68 and 70 of the main body 42. The main body generally follows the configuration of the passages heretofore described, as is more clearly shown in FIGS. 2 and 3. The lower portions of the ends 68 and 70 of the body 42 are threaded as at 72 and 74 and extend through the holes 24 and 28 respectively, there being ledges 76 and 78 between the upper portions and the threaded portions which rest upon gaskets 80, which gaskets in turn rest upon the ledge 22. These ends 68 and 70 are utilized for securing the body 42 upon the ledge 22 and are held in place by nuts 82, there being gaskets 84 interposed between the top of the nuts and the bottom of the ledge 22. The threaded portions 72 and 74 are connected respectively with the cold and hot water pipes of the plumbing system.

Each of the passage sections 52 and 54 is internally tapped as at 86, adjacent the mixing chamber 44, for receiving a threaded collar 88. This collar provides a valve seat 90 and forms a central passage or port 92. These ports are normally closed by valves 94 and 96. The valves each include a disc 98 and a stem 100. The discs are adapted to cooperate with the valve seats 90 to control the flow of fluid from the cold and hot water pipes to the mixing chamber. The discs 98 are so positioned as to be subjected to the pressure in the hot and cold water pipe line and are normally urged upon their respective seats 90 by such pressure, and this water pressure is augmented by coil springs 102. These coil springs are interposed between the discs and removable plugs 104. The openings 106 are threaded for receiving the threaded plugs 104 and are of sufficient size to permit the passage therethrough of the collars 88 whereby when a plug 104 is removed, the spring 102, the valve (either 94 or 96) and the collar 88 may be removed. The inner end of port 92 is irregular in shape and preferably so shaped as to receive a Meyers type of wrench by which the collar is fastened and loosened.

Thus from the foregoing it will be seen that access can be readily had to the valves and their respective valve seats by merely removing the plugs 104, there usually being sufficient clearance between the valve body 42 and anything in the rear of the valve body 42 for permitting the removal of the plugs 104 and the removal of the valves and collars 88.

The valve stems 100 are formed integrally with the discs 98 and extend through the ports 92 and into the mixing chamber 44 where they are adapted to be engaged by a cam 108. This cam is carried by the valve stem 50 and is adapted to be raised and lowered or rotated simultaneously with the valve stem 50; the raising and lowering may be independent of the rotation of the valve stem 50 in either direction, or the rotation of the valve stem 50 may be independent of the raising and lowering of the valve stem. The cam 108 is not only eccentric with respect to the axis 46 of the valve stem 50 but is also tapered inwardly downwardly at least at the sides and the front, as is more clearly shown in FIGS. 4, 5 and 6. The valve stem and cam 108 are shown in the neutral position in FIG. 3. By pushing downwardly on the valve stem 50, causing downward movement of the cam 108, the valve stem of valve 94 will be tilted to the left and the valve stem for valve 96 will be tilted to the right, thus admitting equal amounts of cold and hot water; by moving the cam upwardly, the water pressure will move the valves toward their normally closed position and this movement is augmented by the springs 102.

By turning the cam 108 in a counterclockwise direction (as viewed in FIG. 3), the valve stem 100 of valve 94 will be moved to the left to tilt the valve disc 98 of valve 94 to open position. Conversely when the cam 108 is moved in a clockwise direction the valve disc of valve 96 will be tilted from its seat by reason of the movement of the valve stem 100 of valve 96 to the right.

Thus it will be seen from the foregoing that the proportion of hot and cold water can be controlled by selectively moving the cam 108 to a desired position. The flow, however, of water from the mixing chamber 44 to the outlet is controlled and regulated by the vertical position of the valve stem 50. This is accomplished through a shutoff valve 110 which is formed integrally with the stem 50 and is preferably tapered to provide a tapered circular valve seat 112. This valve seat 112 is arranged to cooperate with a circular valve seat 114 herein shown as a rubber O-ring. Ring 114 is carried by a hollow fitting 116. The lower end of this fitting 116 is externally threaded as at 118 and is threaded as at 120 into the upper part 122 of the valve body 42. That part 124 of the hollow fitting 116, below the seat 114, forms the upper part of the mixing chamber 44 and that vertically extending part 126 above the seat 114 together with the intersecting holes 128, in the upper part of the fitting 116, forms the outlet from the mixing chamber. As is more clearly shown in FIG. 2, the part of the fitting 116 below the holes 128 is provided with flats 130 by which the fitting 116 can be readily turned by an ordinary wrench.

The upper end of fitting 116 is externally threaded as at 132. A fitting 134 is threaded onto the upper end of fitting 116. This fitting 134 is externally threaded as at 136 to receive a cap 138. The valve stem 50 extends through the passage 126 of fitting 116 and through fitting 134. A handle 140 is pivotally attached by the screw 142 to the upper end of valve stem 50. This handle 140 is provided with a downwardly facing shoulder 143, lying along one side of the stem 50, and is arranged to engage the upper surface 144 of the fitting 134, and is provided with an upwardly facing shoulder 146 which is arranged to engage with the under side 148 of the cap 138. Thus it will be seen that by lifting upwardly on the handle 140, the handle will pivot about the shoulder 146 and force the valve stem 50 downwardly, and, by pushing downwardly on the handle 140, it will pivot about the shoulder 144 and lift the valve stem. Thus opening and closing movement is imparted between the valve seats 112 and 114 and the tiltings of the valves 94 and 96 are effected. The valve stem 50 is sealed at the top by a packing gland including packing 150. This packing is held between a circular shoulder 152 in the fitting 116 and a packing nut 154 which is threaded into the fitting 134.

The fitting 116 is provided with a circular exterior bearing surface 156, concentric of the axis 46 of the stem 50 and a like bearing surface 158 is formed on the fitting 134.

The spout or faucet 160 includes a head 162 having interior circular bearing surfaces 164 and 166 which are journalled respectively on the bearing surfaces 156 and 158 of fittings 116 and 134. Thus the passage 126, holes 128 and the interior of the head 162 of the faucet 160 form the outlet for the mixing valve, which outlet is connected with the spout passage 168 to the outlet 170 of the spout. The lower end of the head 162 is recessed upwardly as at 172 to receive an O-ring 174 which closely embraces the circular fitting 116 and is closely embraced by the head. The fitting 134 is provided with a circular groove 176 for receiving an O-ring 178 which is closely embraced by the head 162. Thus leakage is prevented between the outlet 180 of the mixing valve and the exterior of the valve, while permitting 360 degree movement of the nozzle 160 in a horizontal plane, except for the rod 34.

Referring now particularly to FIGS. 1 and 2, it will be seen that the rear portion of the body 42, rearwardly of the mixing chamber 44, is provided with a downwardly facing shoulder 182 which is provided to form a stop for the rod 34, the rod being bent for this purpose to provide an upwardly facing shoulder 184.

In assembling the valve, the valve stem and the cam carried thereby are first inserted in the body 42, the lower end of the stem 50 being guided by the drilled guide 48. The fitting 116 is then placed in position; then the spout is added, after which the fitting 134 is screwed in position and for this purpose the fitting 134 is countersunk at the top as shown at 186 where it is provided with a non-circular surface for receiving a wrench; next the handle is placed in position and fixed to the stem 50 by a screw 142; after this the cap 138 is added. Next the valve collars 88, valves 94 and 96, springs 102 and plugs 104 are added.

From the foregoing it will be seen that I have provided a mixing valve which can be placed on standard types of wash bowls or sinks in which the rear ledge is drilled to provide three aligned holes. The valve is so shaped so that the center part thereof lies slightly forwardly of the rear of the center hole 26 whereby a drain plug rod may pass downwardly through the hole 26, and, so arranged that the inlet valves are readily accessible for installation or removal. The arrangement also is such that the mixing valve terminates flush or rearwardly of the downwardly sloping wall of the basin 20 per se. If desirable a housing of sheet metal or the like 188 can be utilized for covering the exterior of the mixing chamber and the branches including the ends 68 and 70. To accomplish this the upper part of the body 42 is exteriorly threaded as at 190 for receiving a nut 192 and the in-turned edges 194 of the wall 188 are clamped between the body and the nut 192.

Figure 7:
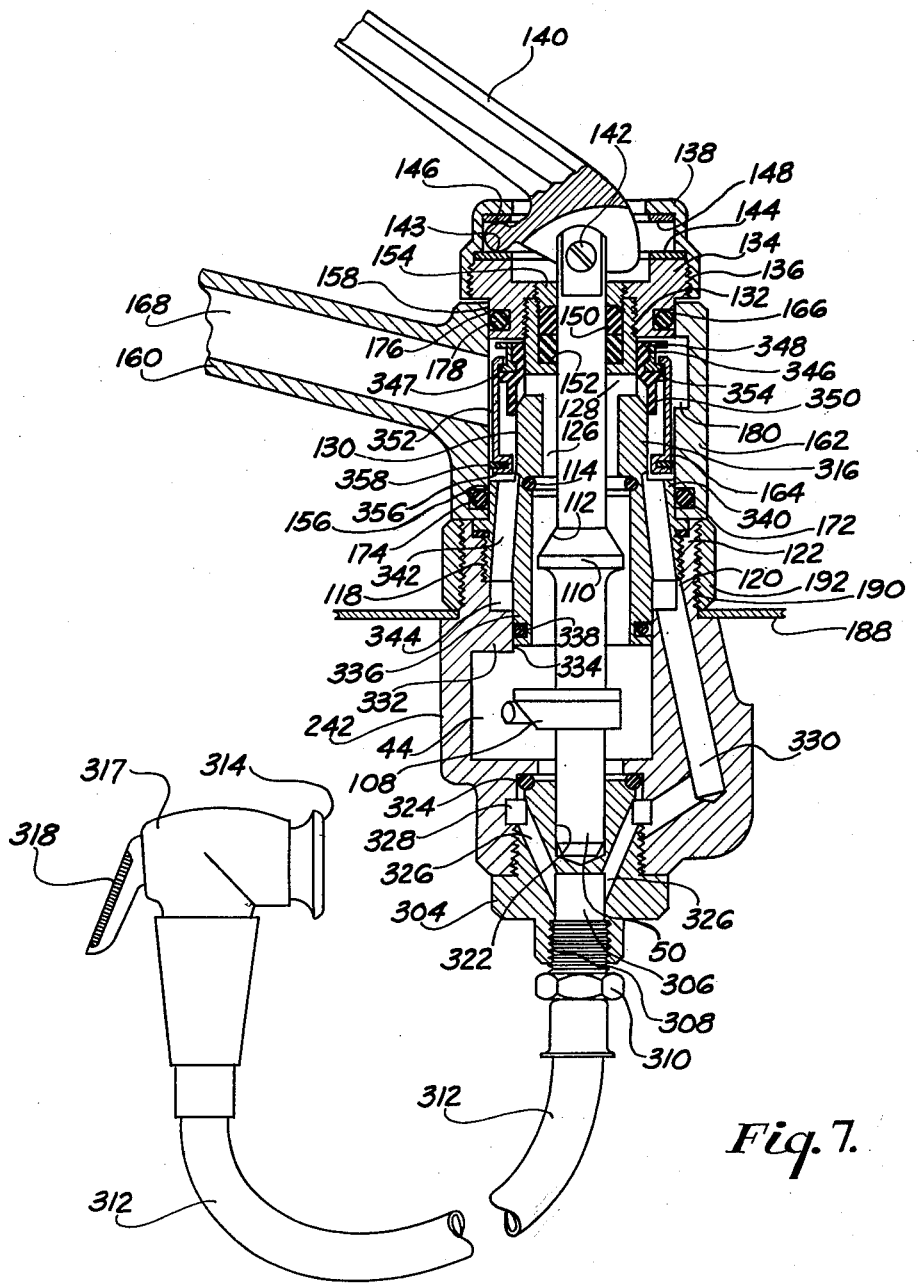
FIG. 7 is a longitudinal sectional view of the embodiment including the diverter.

Referring to the embodiment shown in FIG. 7, the inlet valve mechanism, the rotating and vertically movable valve stem including the shutoff valve, the faucet, spout or nozzle 160, the bearings for the latter and many of the outer parts are the same as is disclosed in the other figures. The main differences between the structure shown in FIG. 7 and the other figures lie in the modifications of the main or lower body, the fitting 316, and the inclusion of a pressure responsive diverter valve.

In FIG. 7, the main body or casting 242, forming the mixing chamber 44, is provided with a removable coupling 304, at the extreme bottom of body 242. This coupling is hollow as at 306 and threaded as at 308 for receiving a threaded fitting 310 of a flexible rubber tube 312. The other end of tube 312 is provided with a spray nozzle 314 having a valve 317 controlled by a lever 318. Coupling 304 is threadably attached with the main body 242. The upper part of coupling 304 is drilled vertically and finished to provide a bearing 322 for the lower end of the rotatable and vertically movable valve stem 50. The joint between the upper part of coupling 304 where it confronts the body 242, is sealed by an O-ring 324. Angularly disposed passages 326 extend from the hollow 306 to the side wall of the coupling; the upper ends of these passages terminating below the sealed joint and register with a circular groove 328 in the body 242.

The main body is provided, at the rear and intermediate the inlet passages to the mixing chamber 44, with a generally vertically extending passage 330 which empties into the circular groove 328. It will be observed that the rear of body 242 is enlarged relative to body 42 of the other embodiment so as to provide for the passage 330.

Body 242 is provided with a horizontally extending wall 332 having a circular opening 334 for receiving a circular skirt 336 depending from fitting 316. The joint between the skirt 336 and wall 332 is sealed by an O-ring 338. As in the embodiment shown in the other figures, the part of fitting 316, below the passages 128 is smaller in diameter than the part 340 therebelow; in this embodiment of FIG. 8, the part 340 is provided with angling passages 342 which lead to the upper part 344 of body 242 i.e. above wall 332. The upper end of the vertically extending passage 330 is connected with the upper chamber 344 of body 342.

The diverter valve includes a ring 346, which is U-shaped in longitudinal cross section, to provide an upwardly facing circular valve seat 347; the inner periphery of ring 346 carries a rubber ring, the upper part 348 of which closely embraces the upper portion of fitting 316 above the outlet passages 128, and includes a skirt 350 which resiliently engage the periphery of fitting 316 below the passages 128. The diverter valve also includes a metallic circular sleeve 352 which is provided with an inwardly turned edge at the top thereof to provide a downwardly facing seat 354 which latter cooperates with the upwardly facing seat 347 of ring 346 to control the flow of water from the outlet passage 128 to the passage 168 in faucet 160. The lower end of sleeve 352 is turned inwardly to form a pressure ring 356, the inner periphery is spaced from the outer periphery of fitting 316 for the ready passage of water to the space therebelow, whence it flows to passages 342, chamber 344, passages 330 and 326, tubing 312, spray nozzle 314 when the valve 317 is open. At this time pressure on the rubber skirt 350 causes the same to expand to permit the flow of water from outlet passage 128, and, the water pressure on pressure ring 356 forces sleeve 352 downwardly whereby valve 354 closes on its seat 347 to prevent the flow of water to the passage 168 of faucet 160. When, however, the spray nozzle valve 317 is closed, water pressure will force sleeve 352 upwardly thereby causing valve 354 to move upwardly away from its seat so that water can freely pass from outlet passages 128 to the passage 168 in faucet 160. A rubber ring 358 is carried by the sleeve 352 for the dual purpose of preventing water from flowing about the sleeve 352 to the faucet when the spray nozzle valve is open and for yieldingly retaining the sleeve 352 in its uppermost position i.e. sleeve 352 is normally held in its upper position whereby valve 354 is open and is moved downwardly only when the spray nozzle valve is opened. The inner periphery 164 of the faucet head 162, in cooperation with the rubber ring 358, provides a guide for sleeve 352.

The skirt 350 on the rubber ring 346 embraces the periphery of fitting 316 when the valve 112 is closed on its seat 114. In this embodiment, the flats 130 are disposed below that part of the fitting which is embraced by the skirt 350. It therefore functions on a valve to prevent syphonic action to partly drain passage 126 in the event that spray nozzle valve is actuated while valve 112 is closed.

From the foregoing it will also be seen that I have materially lessened the cost of manufacture and assembly of the inlet valves and the mechanism for operating the same. Only one cam is necessary, and this is secured to the same valve stem that opens and closes the passage between the mixing chamber and the outlet of the valve. This outlet valve is also so arranged that pressure within the mixing chamber is utilized to urge the valve toward closed positioned; thus should there be any leakage at the inlet valve or valves, the pressure of the water will seal valve 112 on its seat 114.

While the form of embodiment herein shown and described constitutes a preferred form, it is to be understood that other forms may be adopted falling within the scope of the claims that follow.

I claim:

1. A valve comprising means forming a chamber having a lower fluid inlet passage leading thereto and an upper fluid outlet passage leading therefrom, said means forming a valve seat intermediate the inlet and outlet passages; a manually actuated valve cooperating with the valve seat for controlling the flow of fluid from the inlet to the outlet passage, said valve including a downwardly extending valve stem; an exteriorly threaded and hollow coupling connected to the bottom of said means and forming a guide for the lower end of the valve stem, said means forming a passage alongside the inlet passage of the chamber, one end of the latter passage being connectable with the outlet passage, said latter passage extending downwardly into the hollow of said coupling; a flexible tube having one end thereof fastened to the coupling and connected with said latter passage through the hollow of the coupling; a second valve connected with the other end of the said tube, said means providing a faucet spout having a passage leading from the outlet passage; a pressure actuated valve between the outlet passage and the spout passage and responsive to decrease in pressure in the said latter passages for preventing the flow of fluid from the outlet passage to the spout passage and responsive to increase in pressure in said latter passage for causing the said spout passage to be connected with the outlet passage.

2. A valve as defined in claim 1, characterized in that the chamber is an uppright mixing chamber, the means forms two inlet passages leading to the bottom of the mixing chamber and the outlet is at the top of the chamber, said inlet passages being disposed transversely of the mixing chamber and disposed transversely of said latter passage, and that each of said inlet passages is provided with a valve.

References Cited in the file of this patent

UNITED STATES PATENTS

| | | |
|---|---|---|
| 1,577,355 | Palfy | Mar. 16, 1926 |
| 1,960,278 | Niedeckem | May 29, 1934 |
| 2,096,602 | Weingarten | Oct. 19, 1937 |
| 2,110,952 | Glenn | Mar. 15, 1938 |
| 2,301,439 | Moen | Nov. 10, 1942 |
| 2,314,071 | Bucknell et al. | Mar. 16, 1943 |
| 2,608,412 | Bletcher et al. | Aug. 26, 1952 |
| 2,850,042 | Strazdins | Sept. 2, 1958 |
| 2,854,999 | Moen | Oct. 7, 1958 |
| 2,871,880 | Leuthessar | Feb. 3, 1959 |
| 2,998,824 | Ward | Sept. 5, 1961 |

FOREIGN PATENTS

| | | |
|---|---|---|
| 727,864 | Great Britain | Apr. 6, 1955 |